April 21, 1970

A. N. ALEIXO 3,507,741

COMPOSITE FILAMENT WITH ELASTOMERIC CORE
AND CLOSED-CELL FOAM SHEATH

Filed April 26, 1966

INVENTOR
ANTONIO NUNES ALEIXO

BY Donald A. Hoes

ATTORNEY

United States Patent Office 3,507,741
Patented Apr. 21, 1970

3,507,741
COMPOSITE FILAMENT WITH ELASTOMERIC CORE AND CLOSED-CELL FOAM SHEATH
Antonio Nunes Aleixo, Wilmington, Del., assignor to E. I. du Pont de Nemours and Company, Wilmington, Del., a corporation of Delaware
Filed Apr. 26, 1966, Ser. No. 545,481
Int. Cl. D02g 3/04
U.S. Cl. 161—175    11 Claims

ABSTRACT OF THE DISCLOSURE

A composite textile filament composed of a continuous sheath of a closed cell polymeric foam covering an elastomeric core yarn is disclosed. The sheath is under compression and the core is under tension when the composite filament is in unstressed condition, providing efficient use of the retractive power of the core. The sheath hides any discoloration of the core, and protects the core from oxidizing agents. In fabrics, the filament contributes improved cover, opacity and bulk at low area weight.

The filament is made by a process including elongating the core, coating it with a foamable composition, allowing the composition to expand to a closed-cell foam, then allowing the core to retract.

---

This invention relates to a novel textile filament and more particularly to a filament comprising a core of at least one continuous elastomeric strand and a continuous sheath of a closed-cell polymeric foam.

An elastomeric strand is one which has an elongation at failure in excess of 100% and which will return to substantially its original unstressed length after elongation to less than the break-elongation. Although crimping and coiling of the elastomeric strand can contribute additional stretch, such stretch would be mechanical rather than elastomeric. Suitable elastomeric strands are well-known and include, for example, both natural rubber and spandex fibers.

The foamed sheath of the textile filament of this invention completely covers the elastomeric core so as to hide from view any discoloration of the core developing with age. Further, the foamed sheath is impervious so that the elastomeric core is completely protected from laundry bleaches and other oxidizing agents. The novel textile filament provided efficiently utilizes the retractive power of its elastomeric core. Still further, the invention provides a textile filament which, in fabric form, contributes improved cover, opacity, and bulk at unprecedented low fabric weight per unit area.

In accordance with the invention there is provided a textile filament comprising (1) a core of at least one continuous elastomeric strand and (2) a continuous sheath of a closed-cell polymeric foam completely covering the core, said core being under tension and said foamed sheath under compression along the fiber-axis of the unstressed composite filament.

This invention has as another element a process by which the products of this invention can be obtained. A yarn comprising at least one elastomeric strand passes through a zone in which it is held elongated under tension, and while it is still in said zone, a foamable composition is applied to the elongated yarn, said composition is expanded to a closed-cell foam continuously covering said moving yarn, and said foam is sufficiently set that, when the composite filament passes from said zone of elongation to a zone where tension on the composite filament is released, the yarn partially retracts, compressing the foam longitudinally of the fiber-axis until a balance of forces is established which keeps said elastomeric yarn partially elongated and tensioned within its covering of closed-cell foam.

Reference to the attached drawings is made to facilitate an understanding of this invention.

Figure 3:
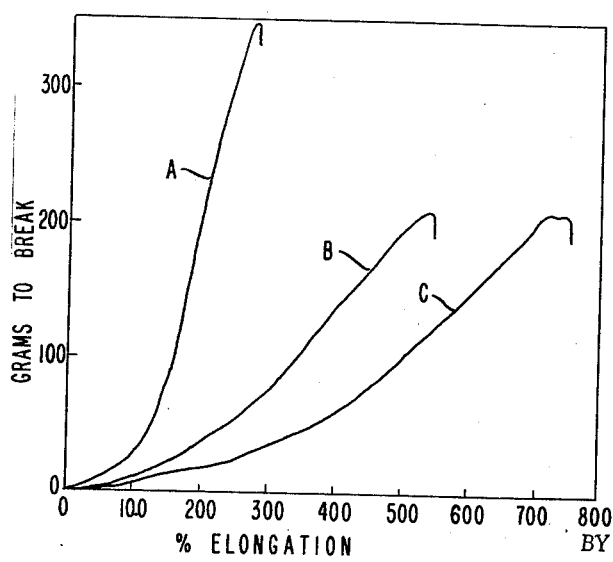

FIGURE 3 presents the load/elongation behavior of elastomeric filaments discussed in Example III.

Figure 4:
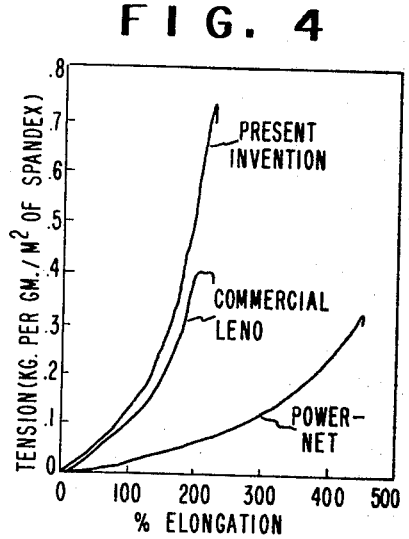

FIGURE 4 presents the load/elongation behavior of three fabrics discussed in Example V.

Figure 1:
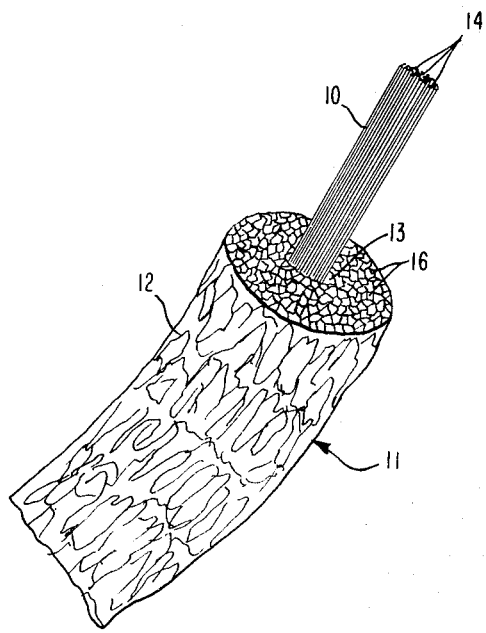
FIGURE 1 is a schematic perspective view of the cut end of a textile filament according to this invention.

The novel textile filament of this invention will now be described with reference to FIGURE 1. A continuous elastomeric yarn 10 comprised of a series of strands 14, at least one of which is elastomeric, is continuously and co-extensively covered with a foamed polymeric sheath 12 of which the foam-cells 16 are substantially all of the closed-cell variety. In FIGURE 1, the foam-sheath 12 is shown cut back so as to readily reveal the elastomeric core 10. The composite filament, generally indicated by the numeral 11, has a balance of forces along its fiber-axis such that core 10 is under tension and sheath 12 is under longitudinal compression. FIGURE 1 is an enlarged view of filament 11 drawn to reveal details without regard to relative dimensions. The relative dimensions of sheath 12, closed cells 16, core 10, and elastomeric strands 14 are, therefore, not necessarily representative of any specific product of this invention.

In order to accommodate the core 10, a central channel 13 must exist throughout the length of sheath 12. Sometimes channel 13 exactly conforms to the size of core 10 so that sheath 12 and core 10 are in contact throughout their lengths. Moreover, penetration of the foamed material into the interstices between strands 14 is also possible. Channel 13 is, however, frequently somewhat larger than core 10, as indicated in FIGURE 1. Unexpectedly, this situation does not destroy the balance of forces which keeps core 10 under tension. Apparently, frictional forces at random contacts between core 10 and sheath 12 are sufficient to prevent retraction of core 10 to its untensioned state.

A simple test suffices to show that an unstressed composite filament 11 has its elastomeric core 10 under tension and its sheath 12 under compression. A piece of filament 11 of known length is incised carefully along its whole length with a single cut extending radially from the outer surface to the surface of core 10. Core 10 is then carefully removed. If the separated core 10 is shorter, preferably by at least 10%, than the original length of filament 11, the necessary balance of forces is shown to have existed. Ordinarily it is preferred that the piece of filament 11 be from about 3 to about 10 cm. long. The separated sheath 12 should show an increase in length. If central channel 13 is larger than core 10, the requisite balance of forces is demonstrated more simply by cutting filament 11 across its axis whereupon the freshly cut ends of core 10 should retract detectably into sheath 12 away from either of its freshly cut ends.

The elastomeric core 10 is preferably a spandex filament or multifilament. Spandex filaments are formed of a segmented polyurethane and are described in several patents among which are U.S. Patents 2,929,801, 2,929,802, 2,929,803, 2,929,804, 2,953,839, 2,957,852, 2,999,839, 3,040,003, and 3,071,557. As described in the aforementioned patents, the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament form, have elongations greater than 150%, tensile recovery of over 90%, and a stress decay of less than 20%, as defined in U.S. 2,957,852.

It is essential that the formed polymeric sheath 12 of the product of this invention have predominantly closed foam-cells, i.e., cells which are spaces completely enclosed by film-like walls of solid polymer. Open-cell foams cannot adequately protect the elastomeric core 10 from oxidation by fumes, bleaches, etc., or from softening by other cleaning fluids. Whether or not closed cells predominate over open cells is ordinarily detected by visual or microscopic inspection. Otherwise, a gas displacement technique such as that described by Remington and Pariser in Rubber World, May 1958, p. 261, can be used especially if modified to operate at the lowest possible pressure differentials.

Cell-size and cell-wall thickness are not critical to this invention. As is well-known, however, opacity and whiteness of a polymeric foam increase with decreasing cell-size, and it is therefore preferred that the foamed sheath 12 have closed cells with maximum transverse dimensions less than about 1000 microns, more preferably 100 microns or less. Likewise, compressibility, softness, and extensibility of foamed structures generally increase with decreasing cell-wall thicknesses, and thicknesses less than about 2 microns are preferred. Still further preferred are foam-sheaths 12 free from external skins of dense polymer other than that contributed by the exposed walls of foam-cells; i.e., the sheath 12 is preferably homogeneously foamed throughout its volume.

Density of the foamed polymeric material of which sheath 12 is composed is not critical, but ordinarily it should be no more than one-half that of its original solid polymer. The preferred resilient closed-cell foams with thin cell-walls frequently have densities which are adjustable as a function of the amount of inflating gas within their cells. Thus, if the cells contain little or no gas, the sheath 12 deflates radially to a maximum density ordinarily in the range of from about 0.05 to about 0.5 gm./cc. If sufficient gas is contained to render the sheath 12 fully inflated, density usually varies between about 0.005 and about 0.05 gm./cc. Varying degrees of partial inflation are, of course, obtainable; and repeated changes in the degree of inflation can be made without affecting the closed-cell nature of the foam. Fully deflated foams generally have higher tensile strengths and elongations at tensile failure, but the same foams when fully inflated are softer, bulkier, and more pneumatic. Foam density and inflation are selected to provide the desired properties of filament 11.

The only limitation on radial thickness of sheath 12 is that it is continuously and completely covers core 10 with a coating at least one cell thick. The less the radial thickness, the lower is the opacity of the sheath 12 and the greater is the tendency of filament 11 to shorten by coiling up as a result of tension on core 10. Preferably, sheath 12 has a substantially uniform radial thickness. Increasing the radial thickness obviates the above problems, but this can be carried so far that filament 11 becomes too bulky and/or too inextensible for many end uses.

Numerous polymers can form foamed sheaths 12 with the necessary properties. These are ordinarily synthetic organic polymers of either the addition or the condensation type, including: polyhydrocarbons such as polyethylene, polypropylene, or polystyrene; polyethers such as polyformaldehyde; vinyl polymers such as polyvinylidene fluoride or polyvinyl chloride; polyamides such as polyhexamethylene adipamide, polycaprolactam, or polymetaphenylene isophthalamide; polyurethanes, both aliphatic and aromatic, such as the polymer from ethylene bichloroformate and ethylene diamine; polyesters such as polyhydroxypivalic acid or polyethylene terephthalate; copolymers such as polyethylene terephthalate-isophthalate; polynitriles such as polyacrylonitrile or polyvinylidene cyanide; polyacrylate such as polymethylmethacrylate; and equivalents.

Particularly preferred as closed-cell polymeric foams in sheath 12 are the ultramicrocellular structures disclosed by Blades and White in U.S. Patent No. 3,227,664. Not only do these structures possess all the preferred properties given hereinabove, but also they have substantially all the polymer in their thin cell-walls, rather than concentrated at the intersections of the walls. The cell-walls are further characterized as exhibiting uniplanar orientation and uniform texture as defined in the patent. Together these latter two properties provide for ultramicrocellular structures their surprisingly great toughness and strength and their high resistance to the permeation of gases.

The degree of inflation of sheath 12 depends on its gas content when exposed to air. If the gases liberated in the initial formation of the foam permeate the cell-walls more rapidly than does air, then they escape from the cells faster than air permeates in, and the sheath 12 becomes deflated. Degree of deflation increases with the difference in permeation rates. On the other hand, if some of the gases originally contained in the cells permeate the cell-walls more slowly than does air, then air enters the cells faster than these original gases escape, and sheath 12 becomes further inflated. Degree of inflation increases with the difference in permeation rates. Regardless of the gas-content or degree of inflation of a closed-cell foam, both may ordinarily be changed by a suitable post-treatment in which the foam is exposed to a volatile plasticizing fluid to temporily decrease the resistance of the cell-walls to gas permeation; and then, while still plasticized, it is exposed to the desired inflating gas. The new inflating gas quickly enters the cells where it becomes trapped when the plasticizing fluid is evaporated off. Re-equilibration with air establishes the new degree of inflation. If at least part of the gas content of the cells is a gas which permeates the cell-walls so slowly as to be substantially permanently retained (i.e., is an impermeant inflatant), the sheath 12 not only inflates fully on equilibration with air but also develops superatmospheric pressures within the closed cells. Such sheaths 12 are highly pneumatic.

Fully inflated sheaths 12 ordinarily have smooth, taut outer surfaces and very high bulk. Deflated sheaths 12 customarily have wrinkled, textured surfaces of lower bulk, though still greater than previously known for fiber-wrapped elastomeric yarns. Degree of inflation can be selected to provide the surface texture needed for a given end use.

Figure 2:
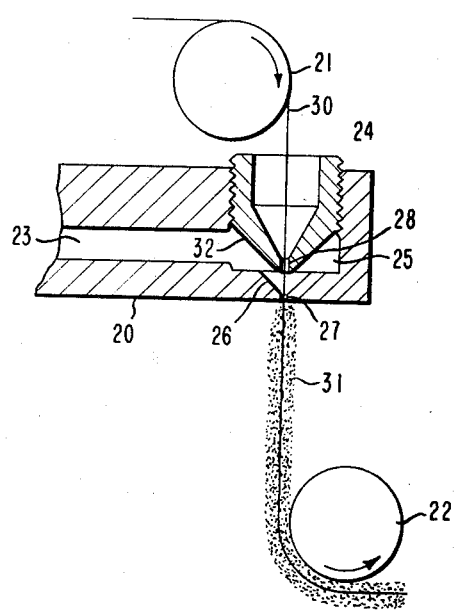
FIGURE 2 is a schematic cross-sectional view in elevation of a device suitable for preparing the textile filament of this invention.

The process of this invention is discussed with reference to FIGURE 2 which is a cross-section in elevation of an apparatus 20 suitable for carrying out the process of this invention. As elastomeric yarn 30 of the spandex type is fed at a controlled speed to apparatus 20 from a supply, not shown, over driven feed-roll 21 which rotates in the direction shown by its arrow. Yarn 30, covered with a closed-cell polymeric foam 31, is drawn away from apparatus 20 by driven take-up roll 22 and is wound into a package, not shown. The peripheral speed of take-up roll 22 is greater than that of feed-roll 21 such that yarn 30, in its zone between rolls 21 and 22, is elongated, preferably to an elongation between about 100 and 700% of the unstressed length. Within this elongation zone, yarn 30 enters apparatus 20 through orifice 28 in threaded gland 24. Surrounded with a foamable composition, yarn 30 leaves apparatus 20 through exit-orifice 27, whereupon the foamable composition is caused to foam and to create closed-cell sheath 31. While yarn 30 remains elongated, foam 31 is set sufficiently that when the composite filament passes roll 22 and tension on composite filament 11 is relaxed, the cellular structure of sheath 31 remains intact during its resultant longitudinal compression.

Foamable composition (not shown) is prepared by known means and injected under pressure into apparatus 20 through channel 23, which terminates in chamber 25.

In chamber 25, foamable composition surrounds moving yarn 30. Although it might be expected that foamable composition would extrude out through both orifices 27 and 28, such is not the case. The pumping effect of moving yarn 30 in close-fitting orifice 28 prevents outward flow, and it simultaneously reinforces flow through exit orifice 27.

In addition to providing orifice 28, threaded gland 24 provides two other functions. When screwed into apparatus 20 until surfaces 26 and 32 intimately contact, it prevents flow of foamable composition without interfering with motion of yarn 30. The need for a separate valve is obviated, which eliminates space beyond a valve where foamable composition can harden and plug the system. Threaded gland 24 also permits adjustment of the opening between surfaces 26 and 32 to control the flow-rate of foamable composition.

For a given foamable composition, at its required temperature and pressure, and for a given geometry of orifice 27, there is a natural flow rate for the composition. It can be varied within limits by the spacing of surfaces 26 and 32, but too narrow a spacing can be deleterious to the formation of a closed-cell foam. Therefore, the linear velocity of yarn 30 through orifice 27 must be adjusted to approximately match the natural extrusion rate of the foam. Since this adjustment is so highly dependent on the given system, no general limits can be specified. For excessive velocity of yarn 30, foam 31 may form discontinuously along yarn 30. If yarn-velocity is low, foam 31 can form thick and thin sections cyclically along yarn 30 and, in the extreme, may wind around yarn 30 in corkscrew fashion without necessarily covering it completely. Within the range of yarn-velocities resulting in a substantially uniformly thick sheath of foam 31, higher yarn-velocities produce thinner sheaths. Ordinarily, orifices 27 and 28 are only enough larger than yarn 30 to permit original string-up, and this consideration fixes their minimum size. Orifice 27 can, of course, be larger to create thicker sheaths of foam 31.

Any method for the extrusion of closed-cell polymeric foams is adaptable to the process of this invention. Thus, solid blowing agents which decompose on heating to form gases are suitable. Or the blowing agent can be either normally liquid or normally gaseous such that it vaporizes and expands the foamable composition on exiting from orifice 27. Particularly preferred is the foam-extrusion process disclosed by Blades and White in U.S. Patent No. 3,227,784 characterized in that full expansion of the foamable composition and solidification of the foam to a stable state both occur within a small fraction of a second after exit from orifice 27, e.g., 0.01 second or less. In this way, any molecular orientation of the polymer in the cell-walls, originating during the rapid expansion, becomes "frozen" in the cell-walls to create a stronger, tougher foam. Moreover, the rapid solidification of foams produced by this process permits the use of shorter distances between exit-orifice 27 and take-up roll 22 than are permissible in most foaming processes.

In known processes for the fiber-wrapping of elastomeric yarns it is ordinarily required that the fiber-wrapping exhibit essentially zero twist. This is achieved, for example, by two wrappings with opposite twist or by random wrapping. Both add complications which increase the cost of the composite filament produced. With reference to FIGURE 1, it is obvious that sheath 12 naturally exhibits zero twist. This fact coupled with the normally very high speeds of foam-extrusion gives the process of this invention a tremendous economic advantage over known methods for covering elastomeric yarns.

Occasionally it is desirable to limit the extensibility of composite filament 11, e.g., in order to prevent tensile failure of sheath 12 in use. This is readily accomplished in the process of this invention by passing at least one conventional non-elastomeric textile strand through orifices 27 and 28 along with elastomeric yarn 30. Linear speed of this strand is determined by take-up roll 22; but, whether or not it is simultaneously drawn, a separate feed-mechanism corresponding to roll 21 should be provided. Release of tension after composite filament 11 passes roll 22 results in a decrease in length of filament 11 until the balance of forces between core 10 and sheath 12 is established. Any conventional non-elastomeric strand within core 10 simply crimps and buckles to accommodate this reduced length. The non-elastomeric strand has substantially no effect on the load-elongation properties of composite filament 11 until elongation of the latter has completely straightened out the non-elastomeric strand, whereupon further elongation is abruptly terminated.

Although sheath 12 physically isolates core 10 completely, the level of its protection from the degradative effects of ultraviolet irradiation depends at least in part on the polymeric composition of sheath 12. Any desired level of further protection from ultraviolet light can be obtained by coating sheath 12 with a UV-screen (i.e., a compound known to absorb ultraviolet irradiation) or by incorporating a heat-stable UV-screen in the foamable composition.

Composite filaments 11, according to this invention, are widely useful in, for example, fabrics for foundation garments, stretch fabrics for outerwear, stretch corners for bed-sheets, stretch bandages, stretch covers for apparatus, industrial fabrics such as belting, and the like. Further specific uses will be apparent to one skilled in the art. By keeping an elastomeric yarn under tension, the products of this invention more efficiently utilize the retractive power of the elastomer. Unlike known wrapped elastomeric filaments, these products protect their cores by completely encasing them. Foam-coating according to this invention is an inexpensive, high-speed process. Fabrics prepared from the filaments of this invention provide better cover and opacity at lower weights per unit of area than previously obtainable. Additionally, they are provided with novel texture, hand, visual, and cushioning properties.

The following examples illustrate the present invention but, since many variations thereof will be evident to one skilled in the art, are not intended as a limitation thereof except as provided for in the appended claims. All parts and percentages are by weight unless specified otherwise.

EXAMPLE I

The process according to this invention was employed to form a composite filament comprising a spandex yarn core and a continuous sheath of closed-cell, foamed, stereo-regular polypropylene. The unstressed spandex yarn was 280 denier and comprised the polymeric reaction product of a polytetramethylene ether glycol, methylene bis(4-phenyl-isocyanate) and hydrazine as disclosed in Frankenburg et al. U.S. Patent 2,957,852. A spinneret assembly as shown in FIGURE 2 was employed. A wind-up roll replaced roll 22 and served to move yarn 30 through orifices 27 and 28. Yarn 30 was thereby pulled from its package, passing consecutively over and under three horizontal steel bars (in place of feed roll 21) which provided sufficient frictional resistance to motion that, in the foam-coating region, yarn 30 was elongated about 400%.

Initially, threaded gland 24 was screwed into apparatus 20 to firmly seat surfaces 26 and 32 and prevent flow of foamable composition. Then, yarn 30 was threaded through the system, and it was set in motion to create the specified zone of elongation. Finally, gland 24 was screwed out to separate surfaces 26 and 32, allowing foamable composition to flow by way of channel 23 out through orifice 27 to foam around and completely cover yarn 30. Separation of surfaces 26 and 32 was adjusted until the foam-coating 31 was uniform.

Channel 23 was connected to a 1.8 liter pressure vessel containing a homogeneous composition of:

|  | Percent |
|---|---|
| Stereo-regular polypropylene | 40 |
| Methylene chloride | 53 |
| 1,2-dichloro-1,1,2,2-tetrafluoroethane | 7 |
| Silica aerogel | 0.2 |

The polypropylene had a melt flow of 0.8 as determined using A.S.T.M. Test Method D1238–61-Condition L. The homogeneous foamable composition was at 135° C. under a pressure from an external nitrogen ballast at 450 p.s.i.g. (31.6 kg./cm.$^2$ gage). Both orifices 27 and 28 were cylindrical openings 0.012 inch (0.30 mm.) in diameter. Yarn 30 passed through the orifices at about 100 yd./min. (91.4 m./min.).

The foamed sheath which resulted had very small, polyhedral-shaped, closed cells which rendered the composite filament opaque and white. Some of the 1,2-dichloro-1,1,2,2-tetrafluoroethane in the foamable composition was retained within the closed cells; and, since it is an impermeant inflatant, equilibration of the sheath with air caused the sheath to become fully expanded, pneumatic, round, and smooth-surfaced. In its relaxed state the composite filament was about 420 denier at a diameter of about 0.04 inch (1.0 mm.). It could be stretched about 200% before tensile failure of the foamed sheath. That the spandex core in the unstressed composite filament was under tension was readily demonstrated by cutting the filament and noting that the freshly cut ends of the core receded into the sheath.

EXAMPLE II

Example I was repeated in every detail except that a 220 denier polyethylene terephthalate non-elastomeric yarn was drawn through the two orifices simultaneously with the elongated spandex yarn. Tension on the non-elastomeric yarn was sufficient only to keep it taut. Appearance of the resultant filament was substantially the same as that of Example I, but it could be elongated only about 60% before the non-elastomeric yarn became tensioned, thus preventing further elastomeric elongation.

EXAMPLE III

Another textile filament composed of a similar spandex yarn coated with closed-cell ultramicrocellular polypropylene was produced substantially as described in Example I. Charged to the 1.8 liter pressure vessel were the following materials previously described.

Polypropylene—600 gm.
Methylene chloride (room temp.)—400 ml.
1,2-dichloro-1,1,2,2-tetrafluoroethane—93 gm.
Silica aerogel—3 gm.

The sealed pressure vessel was heated overnight, with stirring, at 180° C. to create a homogeneous foamable composition. Before extrusion commenced, temperature was lowered to 140° C. and the solution was pressurized by connection to a ballast tank containing nitrogen at 460 p.s.i.g. (32.3 kg./cm.$^2$ gage). The package of spandex yarn was mounted directly onto feed roll 21. Entry orifice 28 was 0.011 inch (0.28 mm.) in diameter, and exit orifice 27 was 0.014 inch (0.36 mm.). A Godet roll 22 pulled the yarn through apparatus 20. Peripheral velocity of the feed roll decreased from 90 to 80 tach units during the extrusion as the yarn package decreased in diameter. Corresponding peripheral velocities of the Godet roll were 535 to 490 tach units, corresponding to about 500% elongation of the yarn during foam coating.

Curve A of FIGURE 3 presents the load/elongation behavior of a single composite filament as produced above at a density of about 0.08 gm./cc. Unstressed, this filament was composed of a spandex core at 105 denier and a foamed sheath at 190 denier. Curve B presents the load/elongation of the core alone after careful dissection from the composite filament. Its denier was 205 as compared to 105 in the composite filament, showing the extent to which the elastomeric core was tensioned and elongated within the composite filament. Curve C is for the original spandex yarn at 280 denier, and comparison with Curve B reveals that foam-coating resulted in some permanent set to a lower denier.

Rarely is a yarn-elongation in excess of 200% required for the construction of stretch-fabrics. To develop its maximum retractive force, the bare spandex yarn of Curve C must be elongated about 700%. The composite filament of this example (Curve A) develops about the same retractive force at only 200% elongation and with a spandex core of less than one-half the original denier. Thus, the foam-coated elastomeric yarn of this example more efficiently utilizes the retractive power of the core by providing, at a lower core-denier, the full retractive power within the commercially desirable range of yarn-elongation.

EXAMPLE IV

Using the procedure of the previous examples, a composite filament composed of a core of the spandex yarn and a sheath of a closed-cell polyester foam was prepared. The polyester was a copolymer with ethylene glycol of terephthalic and sebacic acids (70/30) with a relative viscosity of 27.2. This relative viscosity is the ratio of the absolute viscosities at 77±0.1° F. (25±0.06° C.) of solution and solvent, said solution being 0.5% polymer in m-cresol. Charged to the pressure vessel were 400 gm. of the copolyester, 200 cc. of methylene chloride, and 25 cc. of dimethylperfluorocyclohexane. During extrusion, the contents were kept at 142° C. under 355 p.s.i.g. (25.0 kg./cm.$^2$ gage) of nitrogen pressure. Both orifices were 0.014 inch (0.35 mm.) in diameter, and the 280 denier spandex yarn was elongated about 500% during foam-coating. The resultant composite filament had a density of about 0.48 gm./cc. with a 1210 denier sheath and 175 denier core. This sheath was sufficiently compressible that the core was held extended no more than 60% over its original length. That the sheath predominated in closed cells was tested by flattening the composite filament between the fingers and then releasing the pressure. Pneumaticity was felt. Had open cells predominated, the filament would have remained flattened, but it immediately regained its original inflated state. Portions of this product were readily dyed to several deep shades by methods normally used in dyeing polyester textile yarns.

EXAMPLE V

A small-diameter, foam-coated, elastomeric textile filament was produced using apparatus, materials, and procedures common to the preceding examples. The original bare spandex yarn was 140 denier. The homogenous foamable composition contained 600 gm. of stereo-regular polypropylene, 600 cc. at room temperature of methylene chloride, and 3 gm. of silica aerogel. Because no fluorocarbon impermeant inflatant was employed, the fully expanded foam-sheath originally formed deflated soon thereafter by wrinkling and folding of the cell-walls. Solution temperature and pressure during extrusion were 150° C. and 800 p.s.i.g. (56 kg./cm.$^2$ gage), respectively. The two orifices were both 0.008 inch (0.20 mm.) in diameter. Diameter of the stable composite filament with deflated sheath was about 0.008 inch (0.20 mm.) when tensioned only enough to keep the filament straight. Although the denier of the spandex core was not measured directly, that from another specimen prepared in substantially identical fashion was 74 as compared with the original 140 denier.

Leno weaving was employed to prepare a stretch fabric incorporating the composite filament of this example. The warp had 65 ends per inch (about 26 ends per cm.) of a polyethylene terephthalate polyester non-elastomeric yarn contributing 1.49 oz./yd.$^2$ (50.6 gm./m.$^2$) to the fabric weight. The fill was 47 ends per inch (about 18 ends per cm.) of the above composite filament contributing 0.88 oz./yd.$^2$ (29.8 gm./m.$^2$) of spandex core and 1.27 oz./yd.$^2$ (43.1 gm./m.$^2$) of foamed sheath to the fabric weight.

A similar commercial leno woven fabric utilizing a double-wrapped spandex core as fill was obtained for comparison. Both warp and fill were at 55 ends per inch (about 22 ends per cm.), the warp being 1.48 oz./yd.$^2$ (50.2 gm./m.$^2$) of non-elastomeric polyester yarn and the fill 1.11 oz./yd.$^2$ (37.7 gm./m.$^2$) of spandex yarn wrapped with 0.81 oz./yd.$^2$ (27.5 gm./m.$^2$) of nylon filament. Its optical opacity was 46% as compared to 83% for the fabric with foam-covered spandex yarn.

Comparison was also made to a commercial powernet knit fabric composed of bare spandex yarn at 2.32 oz./yd.$^2$ (78.7 gm./m.$^2$) knit with a nylon yarn at 5.05 oz./yd.$^2$ (171.3 gm./m.$^2$). Optical opacity was 68%.

In one comparison, portions of each of these fabrics were submerged for 4 hours at room temperature in 50:1 diluted commercial hypochlorite bleach. The commercial leno fabric was mildly yellowed, the powernet fabric was severely yellowed, but the fabric utilizing the foam-covered spandex yarn was unchanged (careful dissection showed the core to be as white as the original). After 3 days of immersion in this same bleach solution, bare spandex yarn was severely degraded while the foam-covered spandex yarns remained white and unaffected.

FIGURE 4 shows the results of grab tensile measurements on these three fabrics, the ordinate being tension in kg. per gm./m$^2$ of spandex yarn In measuring grab tensile fabric between a pair of 1 inch (25 cm.) wide clamps is elongated, each fabric sample being several times wider than the clamps. Measurement was in the "stretchy" direction. It is clear from FIGURE 4 that, by holding the elastomeric core extended within a foamed sheath, the retractive power of the elastomer was more efficiently utilized.

What is claimed is:

1. A composite textile filament comprising a core of at least one continuous elastomeric strand and a continuous sheath of a closed-cell polymeric foam completely covering the core, said core being under tension and said foamed sheath under compression along the fiber-axis of said composite filament when in unstressed condition.

2. A textile filament according to claim 1 wherein said elastomeric strand is a spandex filament.

3. A textile filament according to claim 2 wherein said core further includes at least one non-elastomeric textile strand to limit the extensibility of said composite textile filament.

4. A textile filament according to claim 1 wherein said polymeric foam is a resilient uniform sheath composed of polyhedral-shaped cells having closed cells with maximum transverse dimensions of no more than about 100 microns.

5. A textile filament according to claim 4 wherein said polymeric foam is an ultramicrocellular structure whose cell walls exhibit uniform texture and uniplanar orientation.

6. A textile filament according to claim 5 wherein the cells of said ultramicrocellular structure contain an impermeant inflatant, the foam density being about 0.005 to about 0.05 gm./cc.

7. Process for producing a composite foam covered elastomeric core which comprises feeding a yarn containing at least one elastomeric strand through a zone in which it is held elongated under tension and, while it is still in said zone, applying thereto a continuous coating of a foamable composition, allowing said composition to expand to a closed-cell foam continuously covering said elongated moving yarn, and thereafter passing the composite filament from said zone of elongation to a zone where tension on the composite filament is released, thereby causing said yarn to partially retract and the foam to be compressed longitudinally of the fiber-axis until a balance of forces is established which keeps said yarn partially elongated and tensioned within its covering of closed-cell foam.

8. Process according to claim 7 in which the core yarn is elongated between about 100% and 700% of its unstressed length at the time it is coated with said foamable composition.

9. Process according to claim 7 in which said yarn additionally includes at least one non-elastomeric textile strand to limit the extensibility of said composite foam-covered elastomeric core.

10. A textile filament according to claim 2 wherein the polymer of which said polymeric foam is composed is polypropylene.

11. A textile filament according to claim 4 wherein said elastomeric strand is a spandex filament and the polymer of which said polymer foam is composed is polypropylene.

References Cited

UNITED STATES PATENTS

| | | | |
|---|---|---|---|
| 2,122,728 | 7/1938 | Shepherd | 57—168 X |
| 2,539,300 | 1/1951 | Foster | 57—168 X |
| 3,115,745 | 12/1963 | Lathem et al. | 57—168 X |
| 3,158,985 | 12/1964 | Spicer | 57—168 X |
| 3,227,664 | 1/1966 | Blades et al. | 161—57 X |
| 3,382,662 | 5/1968 | Seelig et al. | 161—175 X |

ROBERT F. BURNETT, Primary Examiner

L. M. CARLIN, Assistant Examiner

U.S. Cl. X.R.

57—153; 117—7